March 20, 1934.  W. MacKIRDY  1,951,428
POWER UNIT FOR VEHICLES
Filed Feb. 26, 1930  3 Sheets-Sheet 1
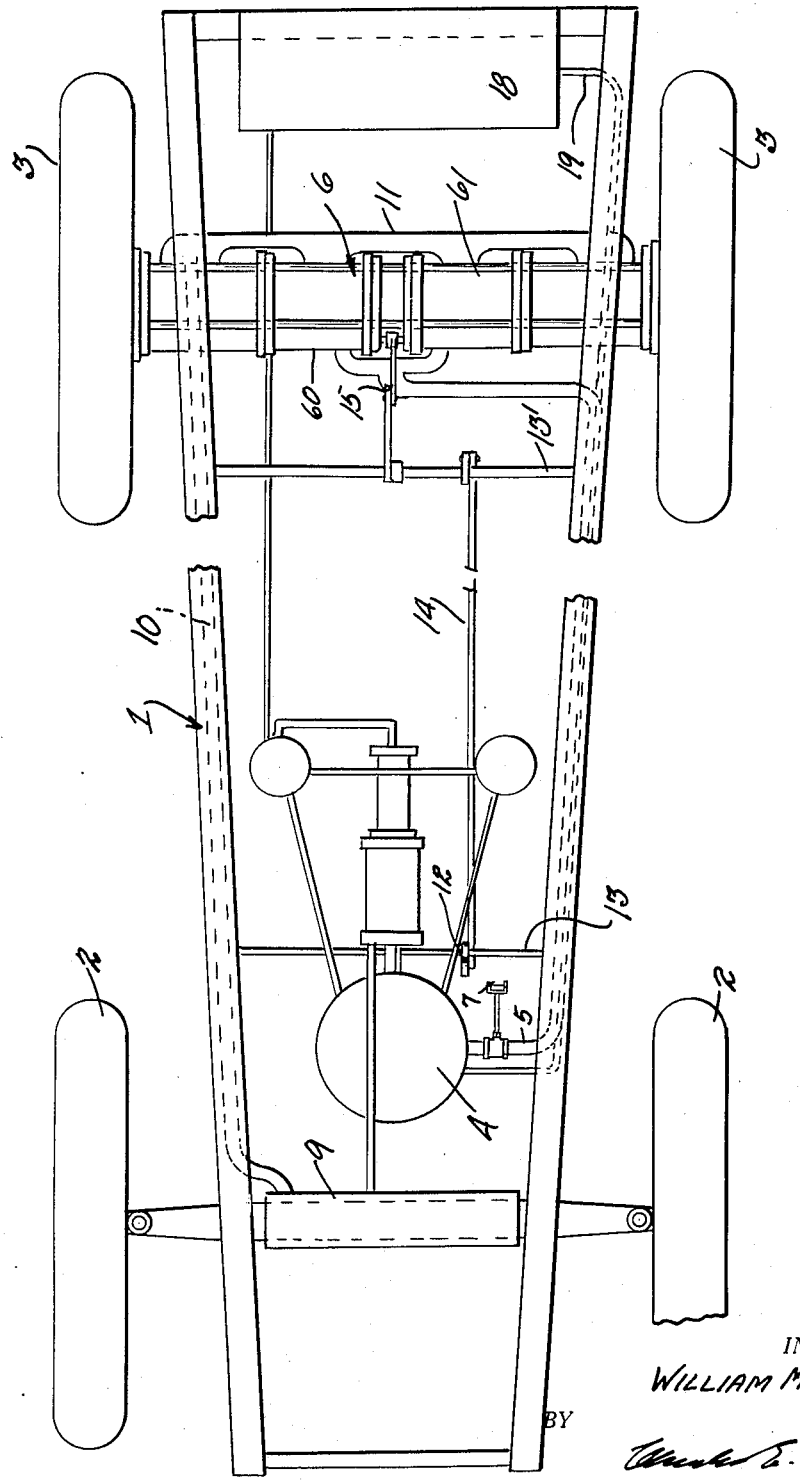
INVENTOR.
WILLIAM MACKIRDY
BY
ATTORNEY.

March 20, 1934.  W. MacKIRDY  1,951,428
POWER UNIT FOR VEHICLES
Filed Feb. 26, 1930  3 Sheets-Sheet 2
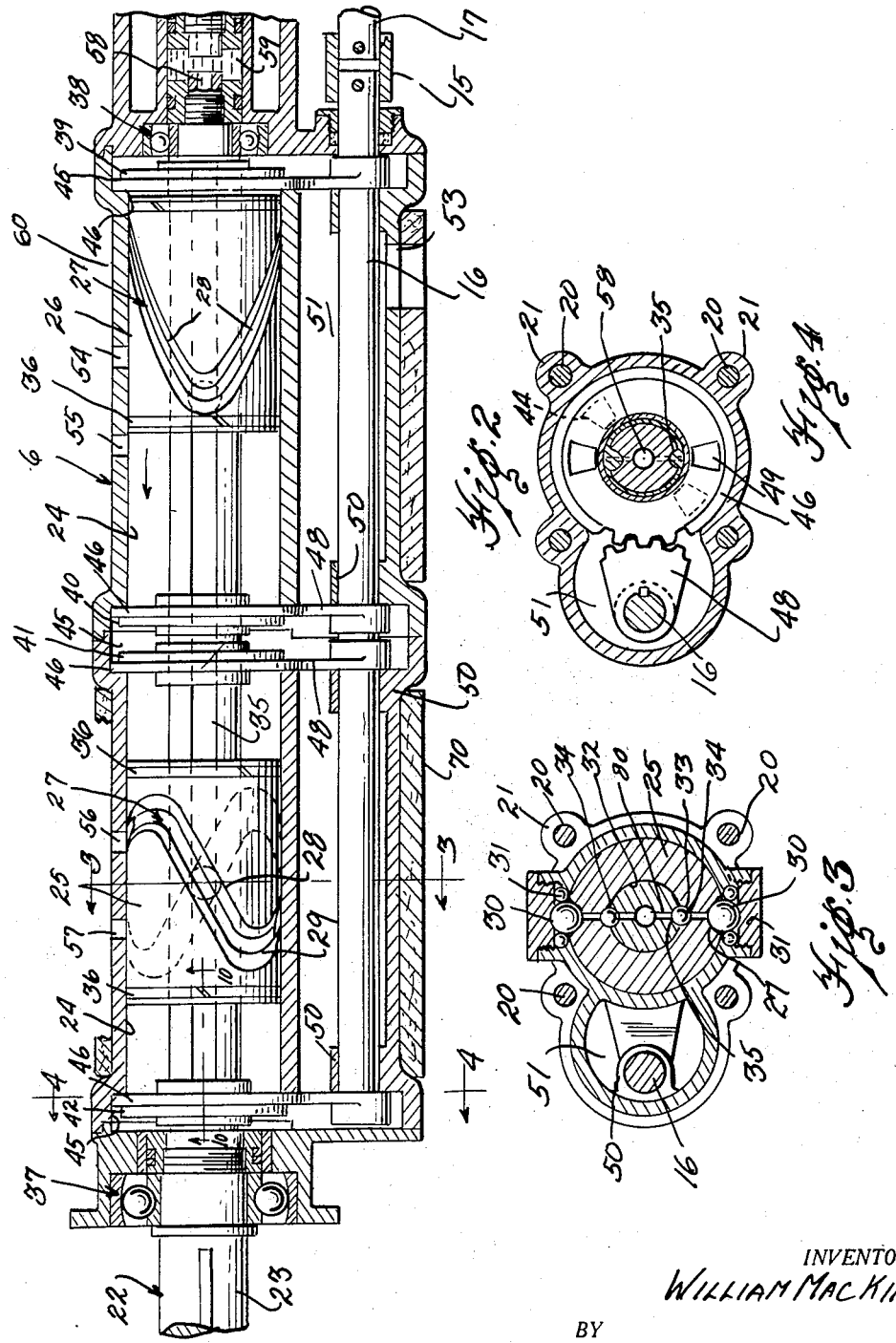
INVENTOR.
WILLIAM MacKIRDY
BY
ATTORNEY.

March 20, 1934.  W. MacKIRDY  1,951,428
POWER UNIT FOR VEHICLES
Filed Feb. 26, 1930   3 Sheets-Sheet 3
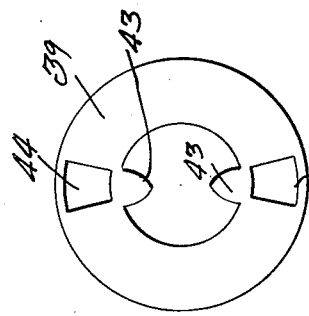
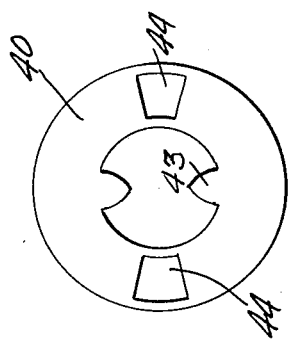
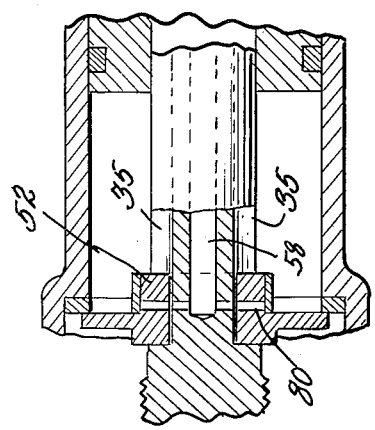
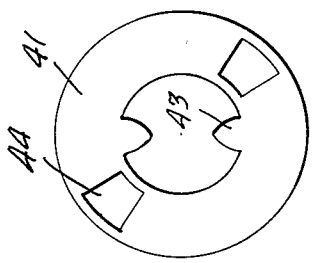
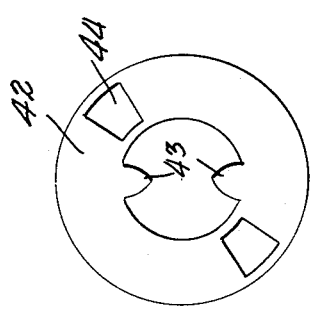
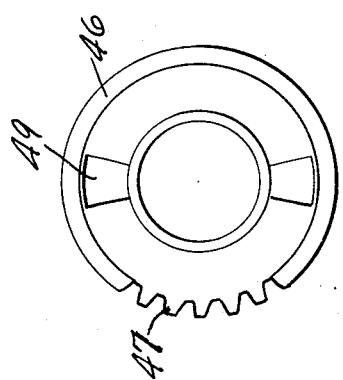
INVENTOR.
WILLIAM MACKIRDY
BY
ATTORNEY.

Patented Mar. 20, 1934

1,951,428

UNITED STATES PATENT OFFICE 1,951,428

POWER UNIT FOR VEHICLES

William MacKirdy, Windsor, Ontario, Canada

Application February 26, 1930, Serial No. 431,376

4 Claims. (Cl. 121—119)

This invention relates to power units for vehicles and more particularly to that type of power unit known as a steam engine.

An object of this invention is to provide a pair of power units that are mounted upon the drive shafts of a vehicle in such a manner as to permit either drive shaft to move relatively faster or slower than the opposite shaft.

Another object of this invention is to provide a power unit mounted upon a pair of drive shafts whereby the relative rotation of the drive shafts in relation to each other is controlled by the propelling mechanism mounted upon each end of the drive shafts.

Another object of the invention is to provide a pair of drive shafts having reciprocable pistons mounted thereon, whereby reciprocation of the piston will impart rotation to the drive shafts.

Another object of the invention is to provide a pair of drive shafts having steam operated pistons reciprocable thereon, reciprocation of the pistons imparting rotation to the drive shafts and the provision of valves at opposite ends of the pistons whereby rotation of the drive shafts will cause the valves to open and close to admit steam at both ends of the pistons.

Another object of the invention is to provide a steam operated power plant consisting of two sections, one section of the power plant imparting rotation to one of the drive wheels of a vehicle and the other section of the power plant imparting rotation to the opposite drive wheel.

Another object of the invention is to provide a steam operated power plant consisting of two sections, each section having pistons mounted therein and adapted by their reciprocation to impart rotation to the respective drive wheels of a vehicle.

With these and other objects in view the several novel features of the invention are hereinafter more fully described and claimed and the preferred form of construction by which these objects are attained is shown in the accompanying drawings in which—

Fig. 1 is a top plan view of a motor vehicle chassis showing my improved power plant mounted on the rear drive shaft thereof.

Fig. 2 is a horizontal longitudinal section through one-half of the power plant.

Fig. 3 is a section taken on line 3—3 of Fig. 2.

Fig. 4 is a section taken on line 4—4 of Fig. 2.

Figs. 5, 6, 7 and 8 are detail elevational views of the respective rotating valve discs.

Fig. 9 is a detail elevational view of one of the oscillating valve discs.

Fig. 10 is a section taken substantially on line 10—10 of Fig. 2.

Referring now to the drawings wherein like reference characters designate like parts throughout the several views. The reference character 1 indicates a chassis of conventional design provided with the front wheels 2 and the driving wheels 3. I have indicated diagrammatically in Fig. 1 a steam generating plant which includes a steam chamber 4 connected by a service line 5 with the power plant 6 at the rear of the vehicle. A throttle valve 7 is provided in the line 5 and the exhaust gases may be passed from the exhaust manifold 11 of the power plant through the pipe 10 to a radiator condenser and fuel is transferred from the fuel tank 18 into the rear of the vehicle by means of a line 19 to the steam plant. However, it is to be understood that what is here stated as indicating a steam plant and diagrammatically shown in Fig. 1 is merely illustrative of any appropriate type of steam generating plant the construction of which is not material to this invention. A reversing lever 12 is mounted upon a cross shaft 13, the lower end of the lever 12 is connected to a cross shaft 13' by means of the link 14. A centrally disposed link 15 has one end operated by the cross shaft 13' and has the other end connected to a pair of rocker shafts 16 and 17 respective so that movement of the lever 12 will impart oscillation to the rocker shafts 16 and 17, for a purpose to be later described. As will be further noted from Fig. 1 fuel under pressure is supplied to the steam generator 4 from the fuel tank 18 by means of a feed pipe 19.

Referring now to Fig. 2 it will be seen that the power plant 6 comprises a series of longitudinally extending sections the said sections being secured together by means of the rods or bolts 20, extending through ears 21 on the several sections.

Inasmuch as the two sections 60 and 61 of the power plant 6 are identical in construction only one will be described. As will be noted from Fig. 2 the drive shaft 22 has the extension 23 for securing one of the drive wheels 3 thereto by means of a key or the like. The several sections of the power plant 60 are provided with a bore 24 of a diameter sufficient to permit reciprocation of the pistons 25 and 26 therein. The pistons 25 and 26 are provided with an endless groove 27 of a shape best illustrated in Fig. 2. The grooves 27 in the pistons 25 and 26 have the four straight away portions 28 of an angle approximately forty-five degrees to the horizontal center line of the piston and are connected together by the rounded portions 29, as will be noted. The straight away portions 28 alternate, and as best seen from the left hand piston in Fig. 2, form roughly a figure 8. As will be noted from Fig. 3 diametrically opposed balls 30 have approximately one-half of their spherical face engaging in the grooves 27. Thrust bearings 31 engage the opposite spherical face of the ball 30 to take the outward thrust of the balls 30.

The pistons 25 and 26 are apertured centrally thereof, as indicated at 32, for sliding relation on the shaft 22. The pistons 25 and 26 are further provided with spherical recesses 33 of a depth equal to one-half of the diameter of the balls 34. The opposite spherical faces of the ball 34 engage in the longitudinally extending grooves 35 in the shaft 22. The pistons 25 and 26 are provided with sealing rings 36 near the outer ends thereof for engagement with the bore 24.

The power plant 60 is provided near its outer end with a ball race 37 for permitting the shaft 22 to freely rotate therein, and centrally thereof with the bearing 38 for supporting the inner end of the shaft 22.

Mounted upon the shaft 22 are the valve discs 39, 40, 41 and 42 and secured thereto by the integral keys or lugs 43 engaging in the grooves 35 in the said shaft. The discs 39, 40, 41 and 42 are provided with the apertures 44. As will be clearly seen from Figs. 5, 6, 7 and 8 the discs are alike in design with the exception that the apertures 44 are located in different positions to the lugs 43. As best indicated in Fig. 2 the power plant 60 is provided at spaced intervals with the enlarged recess 45 of a diameter equal to the outside diameter of the valve discs 46. There is a disc 46 for each of the valve discs 39, 40, 41 and 42 respectively rotatably mounted on the shaft 22. As clearly indicated in Fig. 9 the valve discs 46 are provided on their periphery with the segmental gears 47 for engaging with the toothed segments 48 secured to the rocker shaft 16.

The valve discs 46 are provided with apertures 49 in their respective faces for periodical registration with the apertures 44 in the discs 39, 40, 41 and 42 respectively.

The rocker shafts 16 and 17 are pivotally mounted in the bosses 50 projecting from the several sections of the power plant 60. It will be seen from Fig. 2 that a longitudinally extending steam chamber 51 is provided in the sections of the power plant 60. As best seen from Fig. 10 the valve discs 46 are mounted respectively upon the hubs 52 of the discs 39, 40, 41 and 42 respectively.

An inlet port 53 is provided in one of the sections of the power plant 60 and connects to the service line 5 for admitting steam to the chamber 51. The several sections of the power plant 60 are provided with the exhaust ports 54, 55, 56 and 57, the said exhaust ports opening to the manifold 11.

The shaft 22 has the bore 58 centrally thereof extending from the inner end to a point approximately in line with the disc 42. The inner end of the bore 58 connects to an oil chamber 59 the same being filled from an oil reservoir (not shown). The shaft 22 is further provided with radially extending oil holes 80 for lubricating the several moving parts in the power plant 60. The power plant 6 may be enclosed with a heat insulating jacket 70, as shown in Fig. 2.

When the disc 39 has been rotated a sufficient amount to cause the ports 44 to move out of registration with the ports 49 in the disc 46 the steam that has been admitted between the end of the piston 26 and the valve disc 46 will expand causing the piston to move to the left an amount equal to the length of the horizontal distance of the groove 27.

When the piston 26 has reached the limit of its movement toward the left the exhaust port 54 will be uncovered allowing the products of combustion to escape through the exhaust port 54 into the exhaust manifold 11. At the same time the valve disc 40 will have been rotated through ninety degrees, thus causing the ports 44 therein to come into registration with the ports 49 in the valve discs 46 adjacent thereto permitting steam to be admitted from the chamber 51 to the left hand end of the piston 26 causing the same to move to the right. When the valves 40 and 46 are out of registration the steam that has been admitted behind the left hand end of the piston 26 will expand causing the piston 26 to move to the extreme right whereupon the exhaust port 55 will be uncovered allowing the products of combustion to pass therethrough to the exhaust manifold 11. At this time the valve 39 will have its apertures 44 registering with the apertures 49 in the valve discs 46 adjacent thereto whereupon the cycle of operation will be continued indefinitely as long as the throttle 7 is open.

As best indicated in Fig. 2 the piston 25 leads the piston 26 by an amount equal to approximately one-half of the length of the straight away portion 28 of the groove 27, or stated in degrees, about forty-five degrees of rotation. The operation of the valves at each end of the cylinder enclosing the piston 25 is the same as the operation of the valves heretofore described.

It will be understood that one piston only would function but in practice it has been found that two pistons will work smoother and the danger of having all of the pistons on dead center is negligible. It will thus be seen that the rotation of the shaft 22 will continue as long as the throttle 7 is open and inasmuch as all of the rotating valve discs are keyed thereto the opening and closing of the several ports will be dependent upon the speed of rotation of the shaft 22. Inasmuch as the right hand section 61 of the power plant 6 is entirely independent of the left hand section 60, the speed of rotation of the left and right road wheels will not always be the same. For instance, in turning a corner it is necessary to have the outside wheel rotate faster due to the greater distance it must traverse in making a turn.

Since the disc valves are dependent upon their opening and closing by the speed of rotation of the road wheels it becomes clearly evident that the shaft of the outside wheel will rotate faster than the shaft of the inside wheel, thus causing the ports in the section of the power plant operating the outside wheel to open and close more rapidly than the ports in the other section of the power plant. It is clear to be seen that no differential gearing is required in a device of this character since the reciprocation of the pistons and consequently the rotation of the shaft is dependent upon the relative speeds of the road wheel.

When it is desired to increase the speed of the road wheels 3 the throttle 7 is opened a greater degree causing a greater volume of steam to enter the chamber 51, and due to the greater volume of steam and the consequent increase in pressure the steam admitted behind the ends of the piston will expand more rapidly causing a faster reciprocation to the pistons and a consequent increase in the speed of rotation of the drive shafts. In reverse order a closing of the throttle 7 will cause a consequent decrease in pressure in the chamber 51 and a like decrease in the speed of reciprocation of the piston thus causing a slowing down of the rotation of the road wheel 3.

When the throttle 7 is completely closed shutting off the admission of steam from the generator to the chamber 51 the pistons in the power plant will cease to function. If, when the power plant is desired to be put in operation again after it has ceased to function, it should so happen that none of the ports in the rotating discs are in registration with the ports in the oscillating discs it is only necessary to move the handle 12 a slight distance forward or backward which will impart an oscillation to the rocker shafts 16 and 17. Thus through the medium of the segments 48 having their teeth engaging with the teeth on the discs 46 the said discs will rotate sufficiently to allow at least one set of ports in the oscillating and rotating discs to come into registration, whereupon the power plant will function as heretofore described.

When it is desired to reverse the rotation of the road wheels 3 the lever 12 is moved forward or backward imparting a consequent oscillation to the rocker shafts 16 and 17. This will cause the discs 46 to rotate aproximately forty-five degrees thus causing the expansible fluid admitted to the ends of the pistons to come into action against the ends of the pistons forty-five degrees sooner than when the road wheels 3 are rotating to cause the vehicle to move forward.

This same advancing of the ports in the discs 46 will cause the pistons 25 and 26 to have a reverse action on the shaft 22, thus causing the road wheels 3 to reverse their rotation.

It is to be understood that the power plant described may be utilized for operation of my structure to which it is applicable.

It becomes evident from the foregoing description that I have provided a power plant consisting of two sections operating independently of each other so that one section of the power plant will operate one drive shaft of a vehicle and the other section of the power plant will operate the opposite drive shaft, and since the opening and closing of the valves in the two respective sections is dependent upon the speed of rotation of the respective drive wheels either section of the power plant is free to operate faster or slower than the other section.

Having thus fully described my invention, its utility and mode of operation, what I claim and desire to secure by Letters Patent of the United States is—

1. A power plant operable by an expansible fluid comprising a cylinder, a drive shaft rotatably mounted therein on the cylinder axis, the cylinder being formed of two sections, a piston in each section slidable longitudinally of the shaft and fixed from relative rotary movement whereby rotation of the pistons rotates the shaft, means for causing rotation of the pistons by movement longitudinally of the shaft, a valve means at each end of each cylinder section, comprising an apertured disc fixed to rotate with the shaft and a second apertured disc lying in engagement therewith and oscillatable on the shaft, the aperture of which registers with the aperture of the first disc through rotation of the shaft, means for supplying expansible fluid to pass to the cylinder sections through the said valve devices, means for simultaneously changing the rotative position of the second set of discs relative to the first set to thereby change the time of admission of fluid to the cylinders, said valves being so arranged that rotation of the shaft through movement of the pistons in the cylinders opens and closes the ports at the respective opposite end of each cylinder section in timed relation with the piston movement, and means whereby movement of the piston by expansible fluid causes rotation of the piston in its cylinder section.

2. In a power plant operable by an expansible fluid, a cylinder, a drive shaft rotatably mounted therein on the cylinder axis, a pair of pistons in the cylinder slidable longitudinally on the shaft and fixed from relative rotary movement, means whereby longitudinal movement of each piston on its shaft rotates the shaft, an expansible fluid chamber extending parallel to the cylinder and a plurality of transverse chambers opening into the first named chamber, a valve means at each end of the cylinder positioned in one of the transverse chambers, and a pair of similar valve means between the adjacent ends of the two pistons positioned in one of the transverse chambers, said valve means comprising an apertured disc fixed to rotate with the shaft, and a second apertured disc in face contact therewith and oscillatable on the shaft, the aperture of which registers with the aperture of the first disc through rotation of the shaft, means for supplying expansible fluid to pass to the cylinder through the said valve devices, means for simultaneously changing the rotative position of the second set of oscillatable discs relative to the first set to thereby change the time of admission of fluid to the cylinder to reverse the direction of rotation of the piston and the drive shaft, said valves being so arranged that rotation of the shaft through movement of the pistons in the cylinders opens and closes the ports at the respective opposite end of each piston in timed relation with the piston movement.

3. In a power plant operable by an expansible fluid, a cylinder, a drive shaft rotatably mounted therein on the cylinder axis, a piston in the cylinder slidable longitudinally of the shaft and fixed from relative rotary movement, means whereby movement of the piston longitudinally of the shaft causes rotation of the piston and thereby rotates the shaft, an expansible fluid chamber positioned adjacent the said cylinder and a plurality of transversely extending chambers opening into the first named chamber, a valve, means at each end of the cylinder positioned in one of the said transverse chambers and comprising an apertured disc fixed to rotate with the shaft, and a second apertured disc in face contact therewith and oscillatable on the shaft, the aperture of which registers with the aperture of the first disc through rotation of the shaft, means for supplying expansible fluid to pass to the cylinder through the said valve devices, and means for simultaneously changing the rotative position of the second set of oscillatable discs relative to the first set to thereby change the time of admission of fluid to the cylinder, said valves being so arranged that rotation of the shaft through movement of the piston in the cylinder opens and closes the ports at the opposite ends of the cylinder in timed relation to the piston movement.

4. In a power plant operable by an expansible fluid, a piston slidably and rotatably positioned therein, a drive shaft connected to the piston whereby rotation of the piston imparts rotation to the drive shaft, means whereby movement of the piston by expansible fluid longitudinally of the cylinder causes rotation of the piston and the drive shaft, an expansible fluid chamber positioned adjacent the cylinder and a plurality of transverse chambers opening into the first named chamber, a valve positioned in one of the transverse chambers and at each end of the cylinder and operable by rotation of the drive shaft to permit admission of expansible fluid to each end of the cylinder, a second shaft in parallel relation with the drive shaft, manually operable means for rotating the second shaft, and means on the shaft connected to each valve for simultaneously changing the time of admission of expansible fluid to the cylinder to impart reverse rotation to the piston and the drive shaft.

WILLIAM MacKIRDY.